(12) United States Patent
Toyooka et al.

(10) Patent No.: US 7,082,555 B2
(45) Date of Patent: Jul. 25, 2006

(54) COMPUTER SYSTEM DYNAMICALLY ADDING AND DELETING SOFTWARE MODULES

(75) Inventors: Akira Toyooka, Tokyo (JP); Kanehide Arai, Tokyo (JP); Hiroo Kanamaru, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 751 days.

(21) Appl. No.: 10/246,557

(22) Filed: Sep. 19, 2002

(65) Prior Publication Data

US 2004/0078686 A1 Apr. 22, 2004

(30) Foreign Application Priority Data

Mar. 6, 2002 (JP) ............................. 2002-060300

(51) Int. Cl.
*G06F 11/00* (2006.01)

(52) U.S. Cl. ............................. 714/48; 714/47; 714/49
(58) Field of Classification Search ................ 719/318; 717/124; 714/47, 48, 49
See application file for complete search history.

(56) References Cited

U.S. PATENT DOCUMENTS

| | | | | |
|---|---|---|---|---|
| 5,664,093 A | * | 9/1997 | Barnett et al. | ................. 714/31 |
| 5,835,765 A | | 11/1998 | Matsumoto | |
| 6,167,538 A | * | 12/2000 | Neufeld et al. | ................ 714/47 |
| 6,349,408 B1 | | 2/2002 | Smith | |
| 6,446,218 B1 | * | 9/2002 | D'Souza | ......................... 714/4 |

FOREIGN PATENT DOCUMENTS

| | | |
|---|---|---|
| JP | 8-328880 | 7/1996 |
| JP | 11-306031 | 11/1999 |
| JP | 2000-29713 | 1/2000 |

* cited by examiner

*Primary Examiner*—Scott Baderman
*Assistant Examiner*—Timothy M Bonura
(74) *Attorney, Agent, or Firm*—Leydig, Voit & Mayer, Ltd.

(57) ABSTRACT

A computer system comprises, a profile for each software module, a software module monitor which detects a failure as failure occurrence information at an early stage at a time of execution of an application based on execution related information recorded in the profile, and notifies a software module manager of the failure, and the software module manager which identifies a failed software module from the failure occurrence information, determines how to handle the software module on the basis of the execution related information and the failure occurrence information, and directs the execution.

4 Claims, 12 Drawing Sheets

FIG.5

DEFECTIVE-SOFTWARE-MODULE REGISTRATION TABLE ~31

| | | | |
|---|---|---|---|
| 1 | SOFTWARE MODULE NAME | sample_module | ~41 |
| | VENDOR NAME | abc corp. | ~42 |
| | DOWNLOADING ADDRESS | http://abc...corp.com/smpl.jar | ~43 |
| | VERSION | 1.0.1 | ~44 |
| 2 | SOFTWARE MODULE NAME | mod-efg-sample | ~45 |
| | VENDOR NAME | EFG Inc. | ~46 |
| | DOWNLOADING ADDRESS | http://efg...inc.com/sample.jar | ~47 |
| | VERSION | 3.12 | ~48 |
| | ⋮ | ⋮ | |

COMPUTER SYSTEM DYNAMICALLY ADDING AND DELETING SOFTWARE MODULES

FIELD OF THE INVENTION

The present invention relates to a computer system having an application framework, to a failure handling method, and to a program for making the computer system function.

BACKGROUND OF THE INVENTION

Portable terminals including mobile telephones and the like are under strong market requirement for ability to handle a variety of functions needed by customers having an increasing variety of needs. Portable terminals, however, only have limited hardware resources in general. Therefore, in order to handle a variety of functions, use is made of a computer system having an application framework configured with e.g. JAVA (Registered trademark of Sun Microsystems Inc.), or a programming language capable of installing (hereinafter called "addition") and uninstalling (hereinafter called "deletion") the application used while the application is executed. Here, the term application framework refers to a unit capable of packaging the functions to be provided as an application per unit of function, adding and deleting these software modules easily and dynamically to and from the application in response to necessity for these functions, and running and stopping the application. The application framework serves as a unit of function of the application, and is now commonly used in portable telephones. Use of such an application framework enables easy handling of a variety of applications even under a condition of limited hardware resources.

FIG. 13 is a diagram which shows a configuration of an expandable application based on the application framework, disclosed in the Japanese Patent Laid-Open Publication No. 2000-29713. Reference numeral 81 indicates an application, 82 indicates an application framework, and 83 indicates software modules.

In general, there are a plurality of software modules 83. In order to achieve a function required appropriately, the application framework 82 adds a necessary, specific software module(s) 83, thereby creating and running an application 81. When there is a demand for another function, the application framework can delete a software module(s) which handle(s) an unnecessary function from the application 81, while keeping a condition in which these deleted software modules can be added again whenever needed. Thus, necessary software modules 83 can be dynamically added as described above. In this way, the application 81 comprises the application framework 82 and a variety of software modules 83, thereby becoming possible to easily handle a variety of needs (functions and alternation, expansion, updating and so on thereof) with a limited computer system resources. It should be noted that FIG. 13 does not show software modules which are deleted, in the sense as has been defined above, from the application 81.

By using a technique that relates to such an application framework, it becomes possible, for example, in an application environment of a handheld device, to provide dynamically and easily an application needed by a user.

However, in the conventional application framework when too many software modules have been added or software modules need too much capacity, there is a disadvantage that the computer system becomes disabled because it is not possible to make available a necessary amount of computer system resources for running the application. Moreover, when a software module includes a failure, there is a possibility that the entire system can become disabled, thereby becoming unable to continue service provided by the application. Such problems particularly easily occur when the application is expanded or updated to a new version by downloading software modules from outside and using them.

Further, the above-mentioned problems typically occur when, under an environment in which computer systems having different computer system resources are mixed (for example, imagine a situation in which portable telephones made by different manufacturers are being mixedly used in the same environment), or the same software modules are downloaded to different computer systems from a network for use in different application frameworks.

If such a failure occurs, it is necessary to separately identify and delete the software module that has failed, or if there is a mismatch with the computer system resources, it is necessary to find another software module that will not cause the mismatch. In any instance, the system must be manually re-started, which has been a major limitation to the use of the system. For this reason, there has been a demand for a reliable computer system capable of avoiding a fatal failure which can be restored only manually, and capable of automatic restoration.

SUMMARY OF THE INVENTION

The computer system including an application framework providing a function of dynamically adding and deleting a software module as an application according to one aspect of the present invention comprises a profile for each software module which records and stores, as execution related information, information concerning execution of the software module, including identification information of the software module, a software module monitor which detects a failure occurring at a time of execution of the software module added as the application, and notifies a software module manager of the failure as failure occurrence information, and the software module manager which identifies a failed software module from the notified failure occurrence information, obtains the execution related information from the profile of the identified software module, determines how to handle the software module on the basis of the obtained execution related information and the failure occurrence information, and directs the execution.

The failure handling method realized on a computer system including an application framework according to another aspect of the present invention comprises detecting a failure having occurred at a time of execution of a software module added to the application framework, identifying the failed software module on the basis of the failure occurrence information detected, and obtaining execution related information of the identified software module from a profile which stores, in advance and for each software module, information concerning the execution of the software module as the execution related information, and determining how to handle the failed software module on the basis of the failure occurrence information and the execution related information obtained, and directing the execution.

The computer program according to still another aspect of the present invention makes a computer execute detecting a failure having occurred at a time of execution of a software module added to the application framework, identifying the failed software module on the basis of the failure occurrence information detected, and obtaining execution related information of the identified software module from a profile which stores, in advance and for each software module, information concerning the execution of the software module as the execution related information, and determining how to handle the failed software module on the basis of the failure occurrence information and the execution related information obtained, and directing the execution.

Other objects and features of this invention will become apparent from the following description with reference to the accompanying drawings.

BRIEF DESCRIPTION OF THE DRAWINGS

FIG. 5 is a diagram which shows an example of a defective-software-module registration table according to the second embodiment.

DETAILED DESCRIPTIONS

Figures 1, 2:
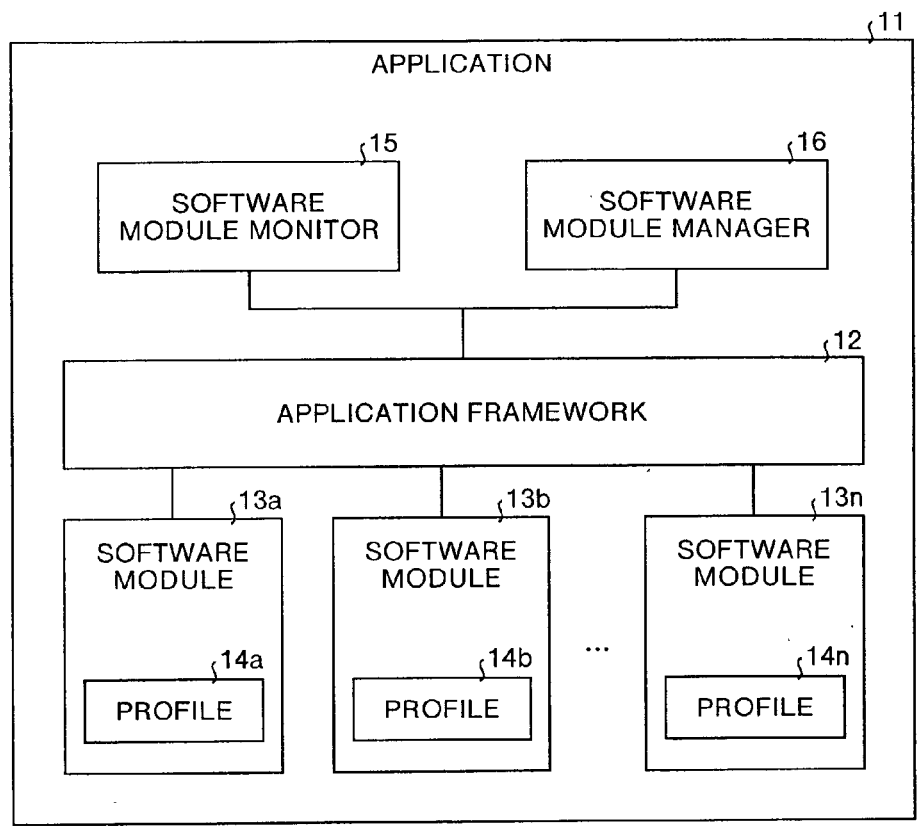
FIG. 1 is a diagram which shows a configuration of an application based on an application framework according to a first embodiment.
FIG. 2 is a diagram which shows an example of an internal configuration of a profile according to the first embodiment.

FIG. 1 is a diagram which shows a configuration of an application based on an application framework according to a first embodiment of the present invention. More specifically, the figure is a configuration diagram of an invention for detecting a failure which has occurred in a software module, determining how to handle the relevant software module based on the detected information about the failure occurrence and execution related information of the relevant software module, and executing the determination.

In FIG. 1, the reference numeral 11 indicates an application for achieving a necessary function in the computer system. The reference numeral 12 indicates an application framework serving as a function unit of the application 11. The reference numerals 13a, 13b, . . . , 13k, . . . , 13n each indicate a software module which is divided by the function and is capable of achieving a predetermined function when executed. An arbitrary one of the software modules will be denoted by the reference 13. The reference numerals 14a, 14b, . . . , 14k, . . . , 14n each indicate a profile which records and stores information concerning the execution of the software module or information for reference in relation to the execution of the software module by each software module as execution related information. An arbitrary one of the profiles will be denoted by the reference 14. The reference numeral 15 indicates a software module monitor which monitors execution status of the software module 13, detects a failure which has occurred in the software module 13, and notifies a software module manager to be described next of the failure as failure occurrence information. The reference numeral 16 indicates the software module manager which receives the failure occurrence information detected by the software module monitor 15, identifies a software module 13k which has failed, obtains the execution related information from the corresponding profile 14k, determines how to handle the failed software module 13k based on the execution related information and the failure occurrence information, and executes the determination.

The term "execution related information" of the software module 13 recorded and stored in the profile 14 includes, for example, identification information of the software module (such as, software name, version, which may also include other information such as a source address which is usable as identification information) and a maximum amount of various resources of the computer system to be used by the software module when this software module is executed (=a maximum amount of computer system resources for the software module).

FIG. 2 shows an internal configuration example of the profile 14. FIG. 2 shows an instance in which a maximum amount of computer system resources required for running the software module is stored as profile information, and the identification information is omitted. The reference numeral 21 indicates a maximum amount of memory used by the software module, 22 indicates the number of simultaneous network connections of the software module, 23 indicates a maximum network bandwidth of the software module, 24 indicates the number of files used simultaneously by the software module, 25 indicates a maximum file occupation region of the software module.

Figure 3:
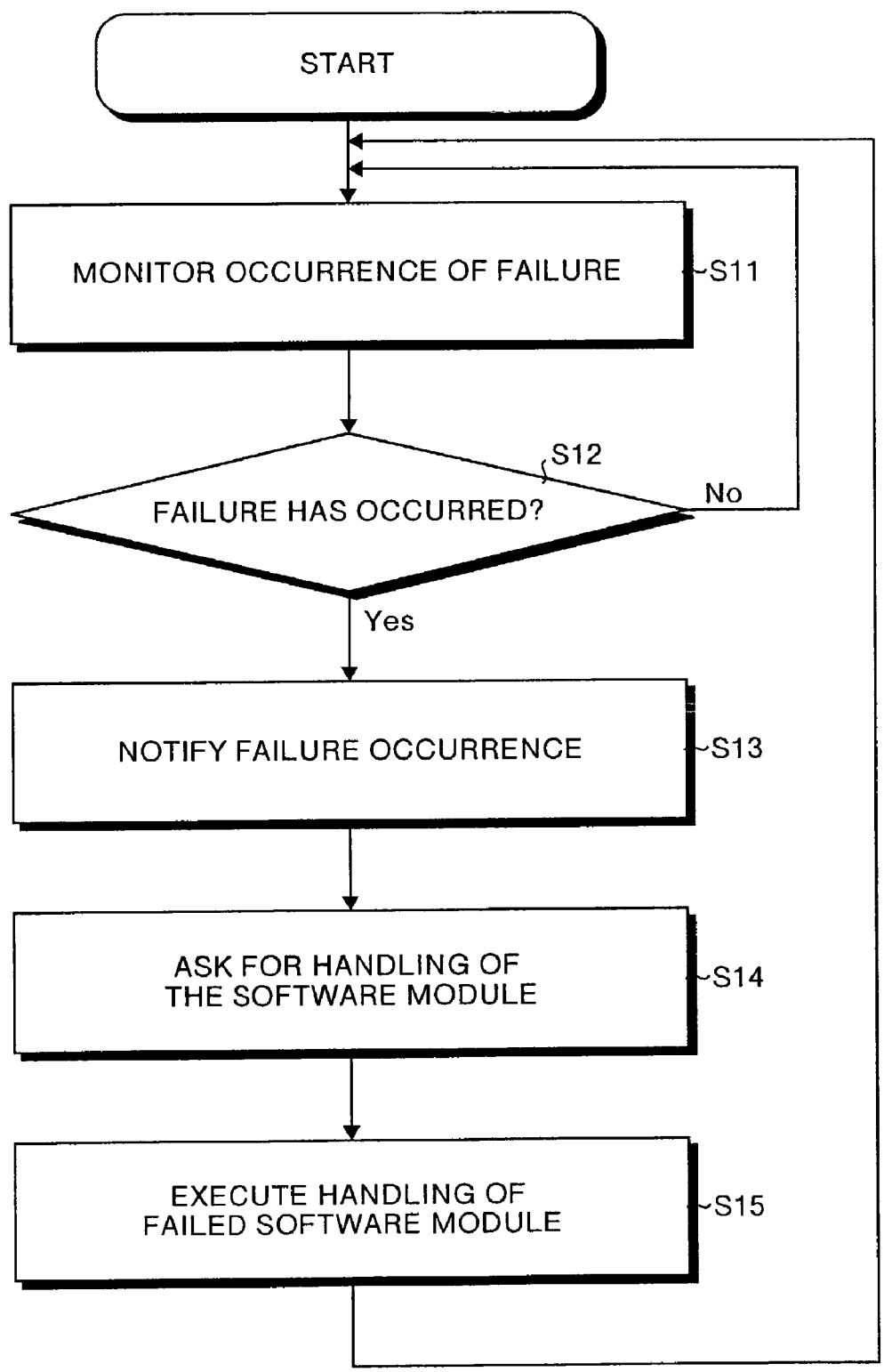
FIG. 3 is a diagram which shows an example of a processing procedure of the application framework according to the first embodiment.

An example of a processing procedure of the application framework according to the present embodiment will be described with reference to the flowchart shown in FIG. 3.

When the application 11 is started to run, at step S11, the software module monitor 15 monitors the software module 13 for an occurrence of a failure. For example, during execution of a software module 13k, the software module monitor 15 monitors if an amount of the computer resources being used by the software module 13k exceeds the maximum amount of the computer resources recorded in a profile 14k which corresponds to the software module 13k, and if exceeds, determines that a failure has occurred in the software module 13k.

At step S12 it is checked if there is a failure occurrence in the software module 13. If there is not, the process goes back to step S11. If there is, the process goes to step S13. At step S13, if the failure has occurred, for example, in the software module 13k, the software module monitor 15 informs the software module manager 16 of the content of the failure.

At step S14, based on the content of the failure received and the information obtained from the profiles 14 of the software module 13, the software module manager 16 determines a handling, e.g. if the execution of the software module should be stopped, if the software module should be deleted, and so on, and requests the application framework 12 to execute the determination. For example, depending on the software module version, the software module may be replaced by another version of the module, execution of this particular module may be stopped, or the module may be deleted from the application.

At step S15, the application framework 12 executes the requested task of stopping, deleting, replacing etc. of the failed software module 13, and then automatically restarts the system.

In the above description of step S14, a determination is made by the software module manager 16 on how to handle the software module 13. In detail, for example, if the failure is a use in excess of an amount of use of a maximum memory, it is considered that the failure can cause a serious influence on the computer system, and therefore the relevant software module is deleted from the application and is replaced with another alternative software module of a different version if available. As another example, if the failure is the number of simultaneous network connections in excess of a maximum number specified in the profile, an option can be that the execution of the software module is posed. Then, depending on the software module, the software module may be provided with information that the module has exceeded in the number of simultaneous network connections or the maximum memory use amount, so that the number of connections or the amount of memory used can be reduced and the software module can continue to run. In any instance, the point is that the occurrence of a failure is notified, and that a determination is made on how to handle the failed software module, based on the relevant software module and information described in the corresponding profile.

Figure 9:
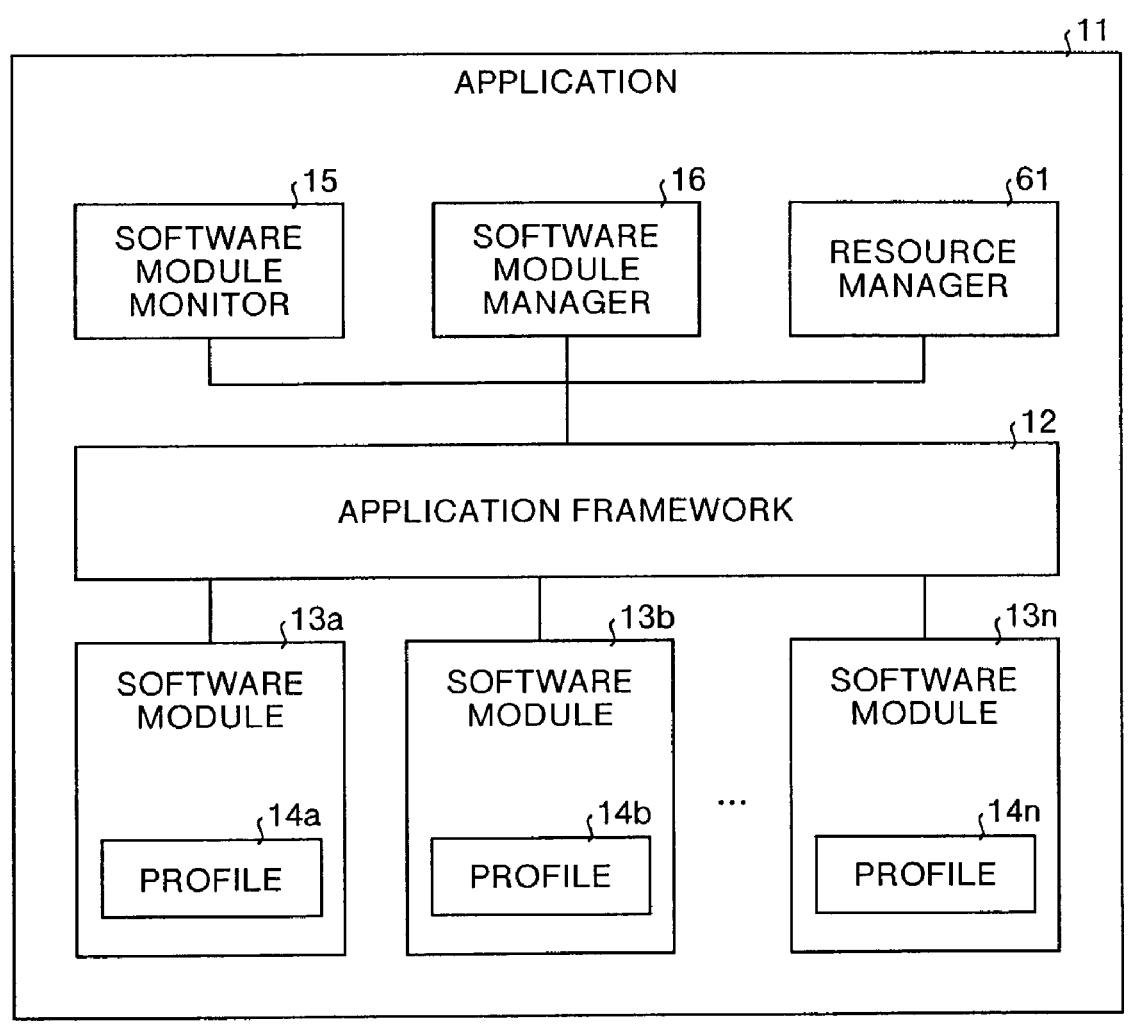
FIG. 9 is a diagram which shows another configuration of an application based on the application framework according to the first embodiment.

Hereinafter, detection process of a failure occurrence in relation to the computer system resources, which is a feature of the present invention, will be described in more detail with reference to FIG. 10. The description will be made based on provision of a resource manager 61 as shown in FIG. 9. However, the resource manager 61, which serves as part of the failure detection function of the software module monitor 15, may be included in or separated from the software module monitor 15. FIG. 1 shows an instance in which the software module monitor 15 includes the resource manager 61, which is therefore not shown. FIG. 9 shows an instance in which the two are provided separately.

The resource manager 61 manages the use status of the computer system resources in all of the software modules, and when any of the software modules is about to use the resources beyond a maximum amount of use of the resource specified in the corresponding profile, detects this as a software module failure.

Further, the software module monitor 15 can also serve for detecting failures other than the above failures concerning the amount of use of the resource, that is, failures related to software modules such as a runtime error. Therefore, with the configuration shown in FIG. 1, the software module monitor 15 can serve for all failure detecting functions including those performed by the resource manager 61, while serving only for failure detecting functions other than those performed by the resource manager 61 under the configuration as shown in FIG. 9.

Figure 10:
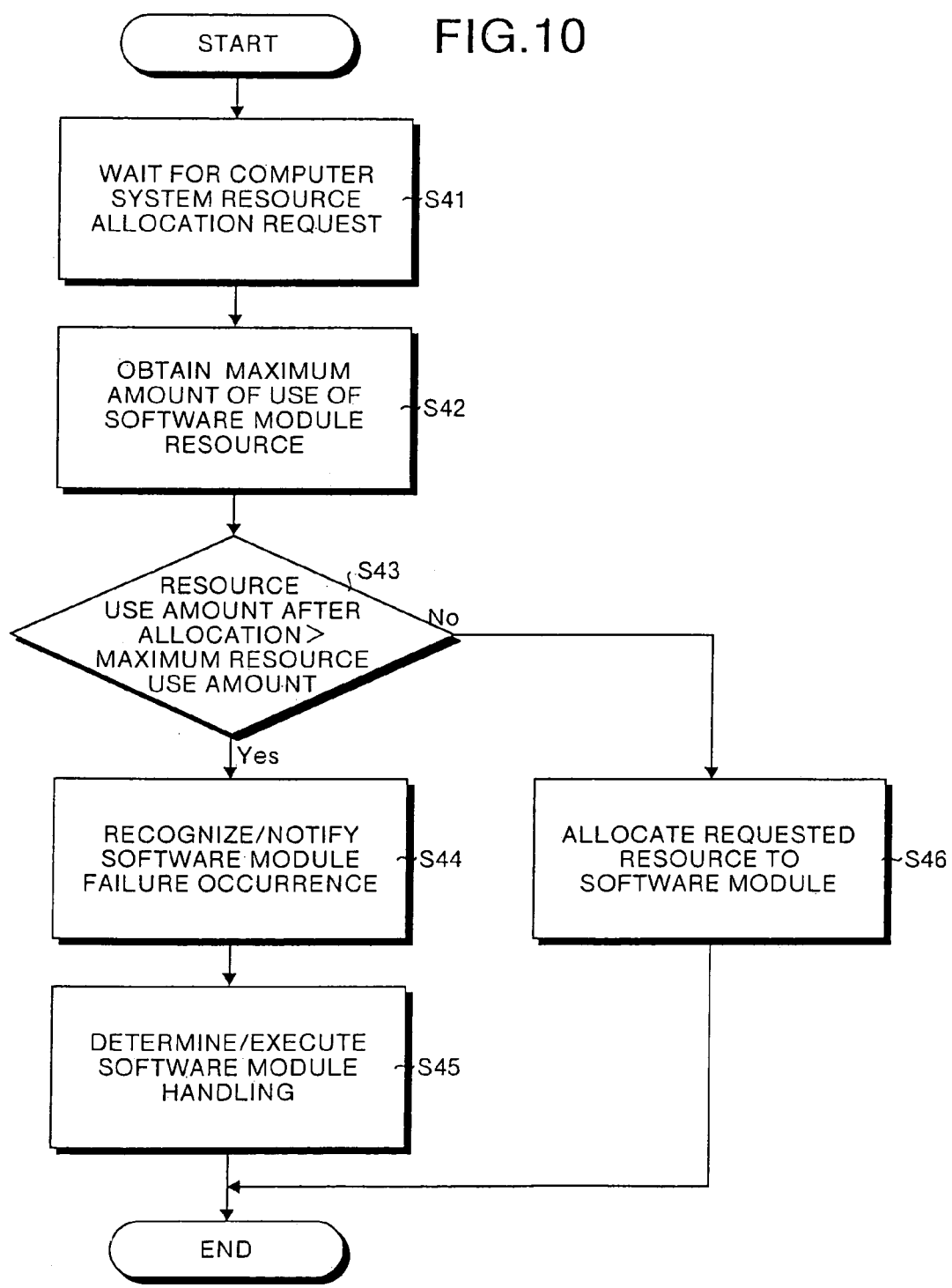
FIG. 10 is a diagram which shows an example of a processing procedure of the application framework according to the first embodiment, together with a process for detecting an occurrence of a failure related to a computer system resource.

In FIG. 10, when the application 11 starts to run, the resource manager 61 starts managing the use status of the computer system resources in each of the software modules 13. At step S41, the resource manager 61 waits for a computer system resource allocation request from a software module 13k. Upon reception of the allocation request, the process goes to step S42. At step S42, the resource manager 61 obtains information on the maximum amount of use of the resource specified for the software module 13k from the profile 14k of the software module 13k which requests the resource allocation.

At step S43, the resource manager 61 checks whether the amount of resources used by the software module 13k after the allocation of the requested resources will exceed the maximum amount of use of the resource allocated to the software module 13k. If exceeds, the process goes to step S44. If not, the process goes to step S46. At step S44, the resource manager 61 recognizes that a failure has occurred in the software module 13k, and notifies the software module manager 16 of this. At step S45, the software module manager 16 selects stopping the execution, deletion from the computer system, restarting of the computer system or stopping of the computer system, as a method for controlling the software module 13k, executes the control, and ends the resource allocation process. At step S46, the resource manager 61 allocates the requested computer resources to the relevant software module 13k, and ends the resource allocation process.

As a note, the description above was made based on the maximum amount of the resource used of the software module. However, depending on how the system is operated, the basis may not be limited to the "maximum amount of resources". Specifically, when a plurality of software modules are used, a simple multiplication of the "maximum amount of use" of resources allocated to each module sometimes results in excess over the permitted amount of use of the computer system resources. Thus, for example, the "maximum amount of use of resources" may be replaced by "norm value on the amount of use" which refers to a norm value on the amount of use of the resource such as a value multiplying a certain percentage (such as 80%) with this value. Hereafter, the "maximum amount of resources" will be replaced with this "norm value on the amount of use", which can include the "maximum amount of use of resources" as well.

As described above, since a software module execution failure occurrence is detected from a request made by the software module for computer system resource allocation and from information on the norm value on the amount of use of the relevant software module resource recorded on the profile, it is possible to detect the failure before the entire computer system becomes disabled. This makes it possible to automate the restoration process. From the above, it becomes possible to improve reliability of the computer system, including the automatic restoration.

As described above, since an occurrence of a failure at a time of running the software module is detected at an early stage, including the checking against the execution related information recorded and stored in the profile, it becomes possible to detect the failure before the entire computer system is disabled, and to perform an automatic restoration process. Thus, it has become possible to improve reliability of the computer system, and to automatically restore the computer system upon occurrence of the failure. Further, since each software module has a profile, the profile can be obtained at the same time when the module is downloaded. Thus, even when such a software module is added to the application, detailed management of the relevant software module as described above can be performed based on the execution related information described in the profile.

The information described above in the profile 14 may include, in addition to those described above, information on "importance", "reliability" and so on of the software module. The "importance" is an index of the importance of the software module in the application, whereas the "reliability" is an index of the software module reliability based, for example, on frequency of failure occurrence during the previous use.

In this instance, when a certain software module 13K fails for example, the software module manager 16 can fetch the "importance" and the "reliability" information of this software from the profile 14k, and determines how to handle the software module, based on the obtained information.

As a note, the above description is made based on a configuration in which the software module monitor 15, and particularly the resource manager 61 for resource management, monitors execution status of the software module 13. However, the configuration may be different. Namely, the software module monitor 15 and the resource manager 61 may be included in the application framework 12, and failure information of the software module 13 detected by the application framework 12 is notified by the application framework 12 to the software module manager 16. This configuration provides the same advantages.

According to the second embodiment, when a software module is newly added to the application, management is made so that an amount of the computer system resources to be needed when running the application after the addition will not exceed a set value for a permitted amount of use of the computer system resources, i.e. an amount of computer system resources allocated in advance to the application.

The software module 13 has norm value information on the amount of use of the computer resources stored in a profile 14k as shown in FIG. 2 provided for each software module 13k. Therefore, upon newly creating the application in response to a requested function, a software module manager 16 first determines what software modules are no longer necessary and what software modules are needed, and then, fetches the norm value information on the amount of use of the computer resources from the profile of each relevant software module, and next, based on the fetched norm value information on the amount of use of the computer resources, checks if the application 11 to be created newly will be within a range of the set value on a permitted amount of use of the computer system resources.

The above process guarantees that an amount of computer system resources needed at a time of running the application is always within the range of the amount of the computer system resources allocated to the application. This eliminates such a problem that a failure such as hang-up occurs due to the excess of the usable resource amount of the computer system while running the application 11 after the replacement or addition of a software module 13. Thus, it becomes possible to improve system reliability.

It should be noted that even after unnecessary software modules have been deleted, if addition of a new software module results in excess over the set value on a permitted amount of use of the resources, the software module manager 16 can read the "importance" and "reliability" information described in each software module linked to the application 11, and delete software modules ranked low in importance or reliability, thereby can choose the addition of the new software module.

According to the above, it becomes possible to add new functions while taking into account the importance and so on of the software modules, and in addition, to eliminate the problems of system failure while running the application 11 after the addition, caused by the excess of the amount of the use of computer system resource. Thus, it becomes possible to improve reliability of the system.

Further, since each software module has a profile, the profile can be obtained at the same time when the module is downloaded. Thus, even when such a software module is added to the application, detailed management of the relevant software module can be performed based on the execution related information described in the profile.

The "norm value on the amount of use" in the second embodiment is utilized, as has been described regarding the first embodiment, as a detection condition for the software module failure occurrence. However, the "norm value on the amount of use" used in the first embodiment may not be the same as used in the second embodiment, and may be defined independently for each. In this instance, two kinds of the "norm values on the amount of use" may be recorded in the profile, or otherwise, only one kind may be recorded so that processing can be made using this "norm value on the amount of use" for each of the cases described in the first and second embodiments. In whichever instance, the same advantages can be obtained as described for the first and second embodiments.

Figure 4:
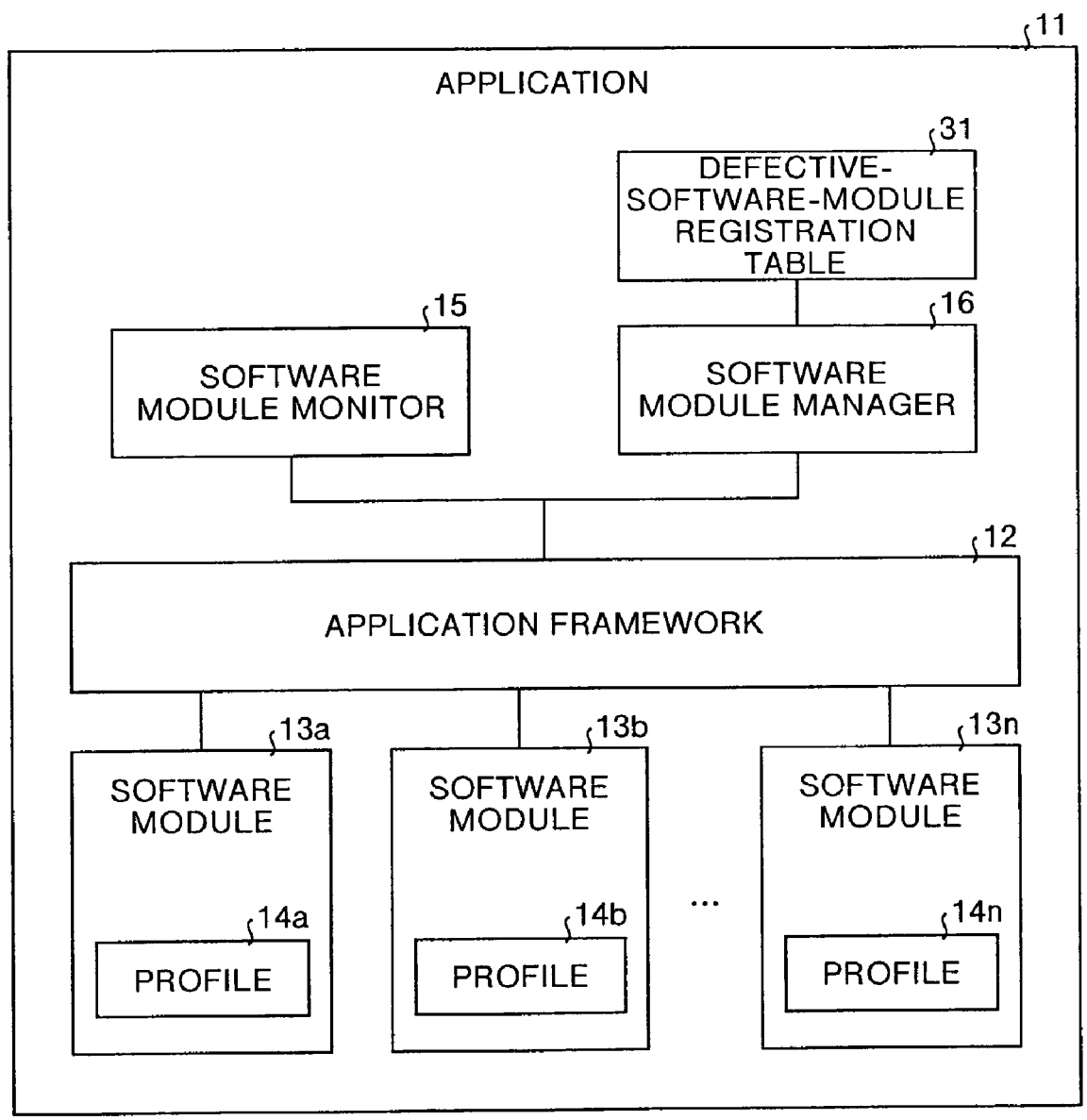
FIG. 4 is a diagram which shows a configuration of an application based on an application framework according to a second embodiment.

FIG. 4 is a diagram which shows a configuration of an application based on an application framework according to a third embodiment of the present invention. More specifically, the figure is a configuration diagram illustrating an invention for preventing addition and execution of software modules which have a possibility of causing a failure, by registering identification information of such software modules in advance on the computer system. In FIG. 4, components other than that indicated by reference numeral 31 are the same as shown in FIG. 1. The reference numeral 31 indicates a defective-software-module registration table holding one or more sets of identification information about software modules which have a possibility of causing a failure.

FIG. 5 is a diagram which shows an example of internal structure of the defective-software-module registration table. This example shows an instance in which two or more sets of defective-software-module identification information have been registered.

In the defective-software-module registration table 31, the reference numeral 41 indicates a name of the first software module, 42 indicates a name of a vendor which is a developer or a distributor of the first software module, 43 indicates an address from which the first software module was obtained, and 44 indicates a version number of the first software module. The reference numeral 45 indicates a name of the second software module, 46 indicates a name of a vendor which is a developer or a distributor of the second software module, 47 indicates an address from which the second software module was obtained, and 48 indicates a version number of the second software module.

It should be noted here that the contained information is similar to the identification information described for the first embodiment included in the "execution related information" recorded and stored in the profile of the software module.

Figure 6:
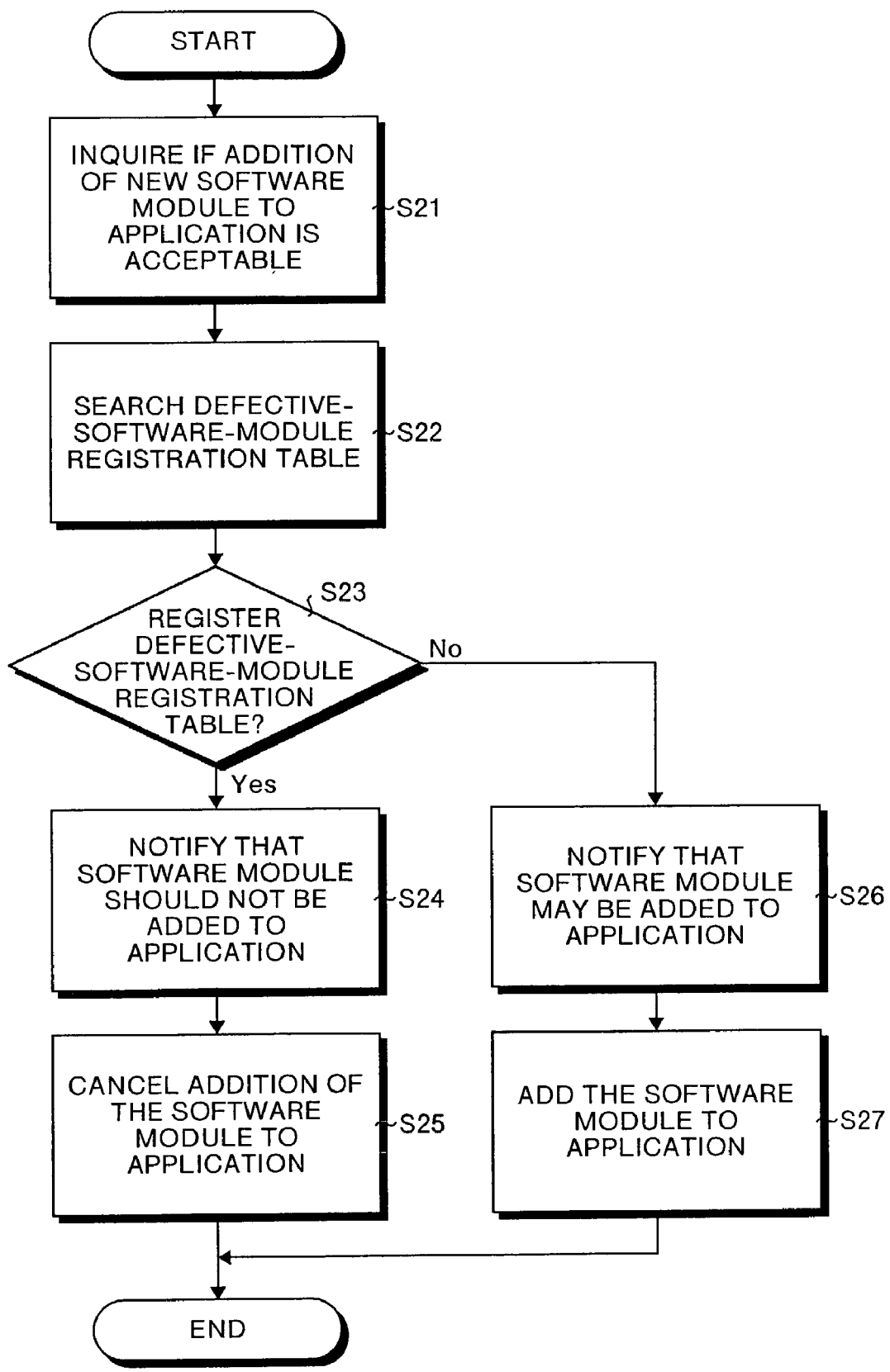
FIG. 6 is a diagram which shows an example of a processing procedure of the application framework according to the second embodiment.

An example of a processing procedure of the application framework according to the present embodiment will be described with reference to the flowchart in FIG. 6.

When an application framework 12 receives a request for addition of a software module, the application framework 12 starts a software module adding process.

At step S21, the application framework 12 makes an inquiry of the software module manager 16 if the addition of a new software module to the application 11 is acceptable. At step S22, the software module manager 16 makes a search into the defective-software-module registration table 31 to see if the software module in question is not on the registration. At step S23, if the software module in question is found on the defective-software-module registration table 31, process goes to step S24, and if not, the process goes to step S26. In this process, whether the software module is on the registration or not is determined based on a comparative reference between identification information described in the profile 14 of the software module 13 in question and identification information registered on the defective-software-module registration table 31.

At step S24, the software module manager 16 notifies the application framework 12 of prohibition against the addition of the software module to the application 11. At step S25, the application framework 12 cancels the addition of the software module to the application 11, and ends the adding process. At step S26, the software module manager 16 notifies the application framework 12 of permission of the addition of the software module to the application 11. At step S27, the application framework 12 performs the addition of the software module to the application 11, and ends the adding process.

This function is useful when, for example, a user is trying to download a software module, together with its profile, via a network for addition of this to the application 11. The defective-software-module registration table is downloaded as a file which has been created in advance, or inputted individually by users. Due to a known fact that sometimes a specific computer system conflicts with a specific software module, the defective-software-module registration table is preferably prepared individually for each model of the computer systems.

As described above, by providing a defective-software-module registration table, it has become possible to make comparative reference, before the adding process of a software module to the application 11, between identification information recorded in the execution relevant information of the profile of the software module and identification information registered on the defective-software-module registration table, thereby enabling the software module manager 16 to determine if the addition of the software module has a high probability of failure. Therefore, it becomes possible to prevent failure occurrence on the computer system, and to improve system reliability.

Further, since each software module has a profile, the profile can be obtained at the same time when the module is downloaded. Thus, even when such a software module is added to the application, detailed management of the relevant software module can be performed based on the execution related information described in the profile.

Figure 7:
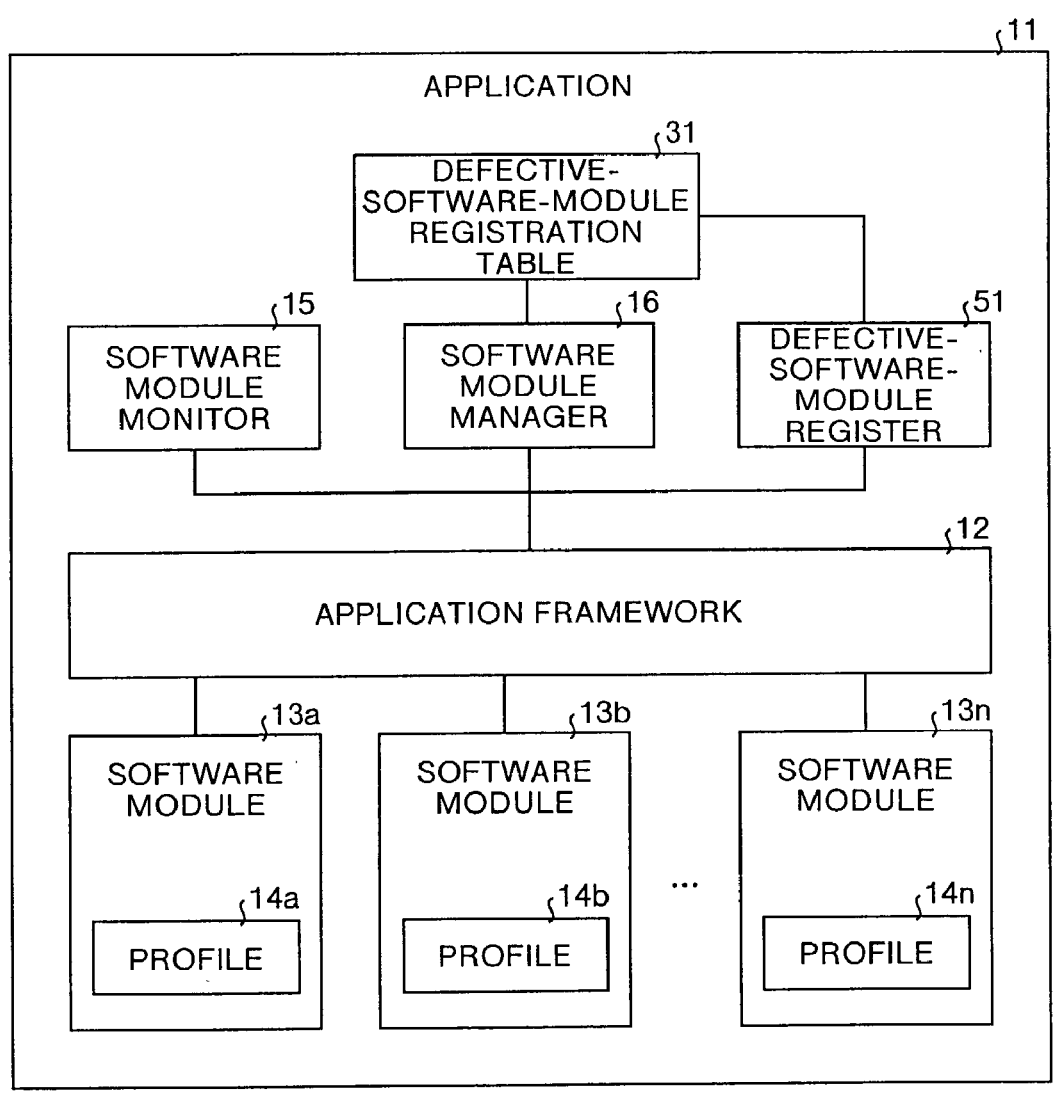
FIG. 7 is a diagram which shows a configuration of an application based on an application framework according to a third embodiment.

FIG. 7 is a diagram which shows a configuration of an application based on an application framework according to a forth embodiment of the present invention. More specifically, the figure is a configuration diagram illustrating an invention for preventing recurrence of a failure by automatically registering on a defective-software-module registration table identification information of a software which has been judged that there is a possibility to fail again from its failure information obtained while running the software module. In FIG. 7, components other than that indicated by reference numeral 51 are the same as shown in FIG. 4 for the third embodiment.

The reference numeral 51 indicates a defective-software-module register which judges, on the basis of failure information detected by the software module monitor 15 at a time of running the software module, if a software module is probable to fail again, and registers identification information of the software module on the defective-software-module registration table 31 if the judge is made such that the software module has a high probability to fail again.

Figure 8:
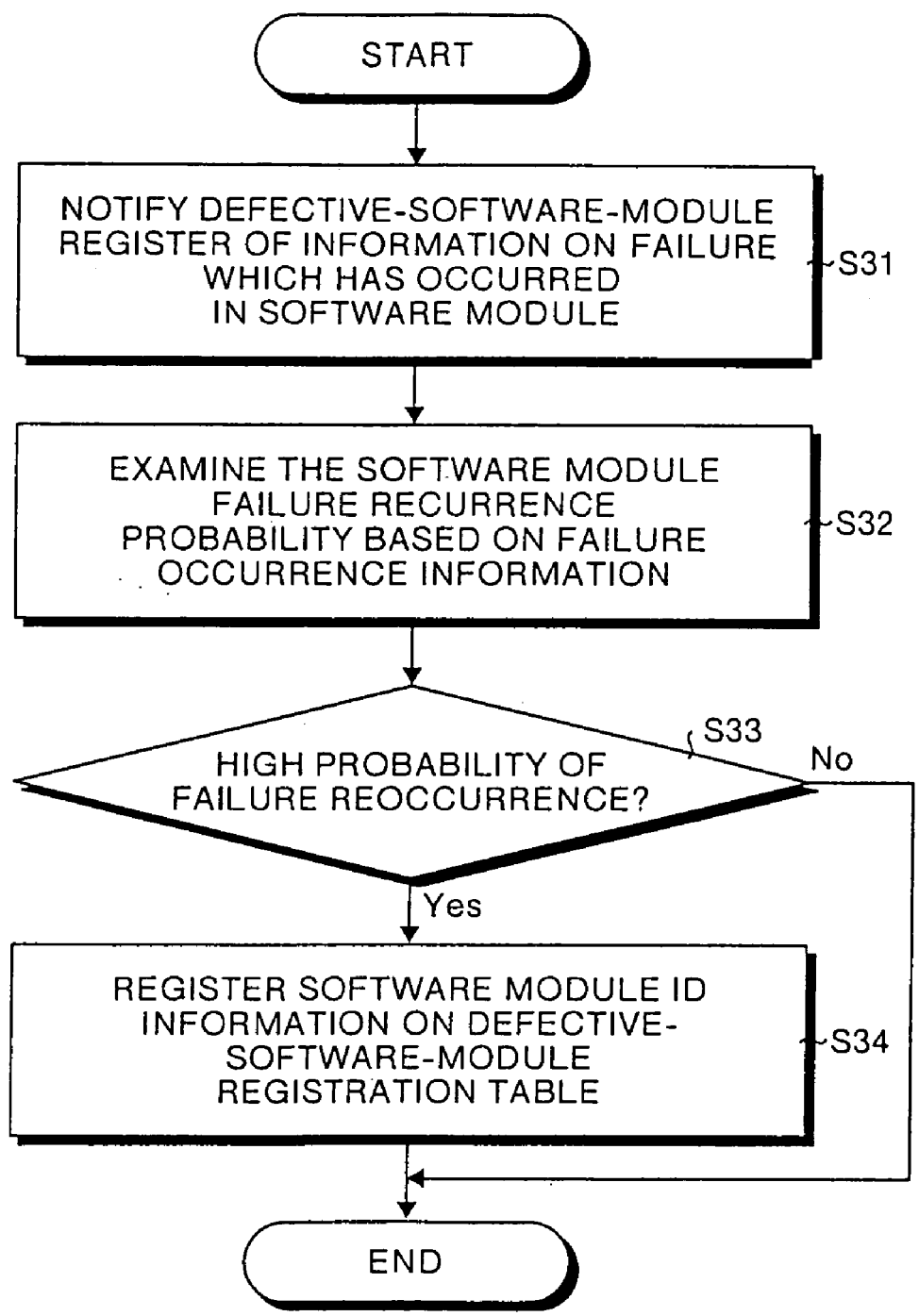
FIG. 8 is a diagram which shows an example of a processing procedure of the application framework according to the third embodiment.

An example of a processing procedure of the application framework according to the present embodiment will be described with reference to the flowchart in FIG. 8. Assume that failure occurrence history of a software module so far is already stored in a corresponding profile.

When a failure occurs in a software module 13$k$, the software module monitor 15 detects the occurrence of the failure, and the application framework 12 starts the following failure-responding process. At step S31, the software module monitor 15 notifies the defective-software-module register 51 of information on the failure which has occurred in the software module 13$k$. At steps S32 and S33, the defective-software-module register 51 determines, from the received failure information, probability for the software module 13$k$ to fail again. Specifically, the failure information about the new failure in the software module is added to the failure occurrence history stored in the profile, and based on this failure occurrence history information, probability for the software module to fail again is estimated. For example, when the number of failure occurrences exceeds a certain number, or depending on the kind of failures, a certain assessment can be made, for example, when the failure is a runtime error, the assessment can be that there is a high probability for failure recurrence, on the other hand, if the failure is a use of computer system resources by the software module in excess of a norm value on the amount of use of the computer system resource, the assessment is not made for a high probability for recurrence before a certain number of the same failure occurs. As a note, the addition of the failure occurrence information to the failure occurrence history may not necessarily be made by the defective-software-module register 51, but may be made by the software module monitor or the software module manager for example. It is important that the failure occurrence history is updated every time a failure occurs.

At step S33, if the assessment was made for a high probability of failure recurrence, the process goes to step S34. If the assessment was made for a low probability of failure recurrence, the system ends the failure-responding process. At step S34, the defective-software-module register 51 fetches identification information of the software module from the profile, registers it on the defective-software-module registration table 31, and then ends the process.

As described above, by making an arrangement such that the defective-software-module register 51 can judge if a software module which has a high probability for failure recurrence, on the basis of a failure occurrence history which includes information about failures which have occurred while running this relevant software module, and can make registration of this on the defective-software-module registration table 31, it has become possible to make a decision in the software module manager 16, before the adding process of the software module to the application 11, whether or not the addition of this software module will lead to a high probability of failure recurrence. Therefore, it becomes possible to prevent recurrence of the failure and occurrence of a serious failure caused thereby on the computer system. Thus, it becomes possible to improve system reliability.

Further, since each software module has a profile, the profile can be obtained at the same time when the module is downloaded. Thus, even when such a software module is added to the application, detailed management of the added software module can be performed based on the execution related information described in the profile. It should be noted here that the failure occurrence history described in the profile is not limited to a history on this computer system. Because each software module has a profile, there is an advantage that even when the module is downloaded externally for use, a failure occurrence history known so far can be recorded in the profile for use. It is further possible that after the downloading, the failure occurrence history can be updated by fetching failure occurrence information which has occurred on other computer systems, through the network.

As a note, in the above description, the software module monitor 15 detects failures that occur in the software module. However, as described for the first embodiment, arrangement may be that the resource manager 61 detects some of the failures. Such an arrangement also provides the same advantages.

The fifth embodiment describes an instance in which a failure handling method is recorded and stored in the profile 14 of the software module 13.

As an example of the record and storage of failure handling method, the profile 14 shown in FIG. 2 may record information relevant to the failure handling method, by the type of failures. The stored information may not necessarily be the information relevant to the failure handling method, but may be a place of reference where the information relevant to the failure handling method is described. The types of failures may be defined in many ways. For example, when a software module uses computer system resources in excess of a norm value on the amount of use of the corresponding computer system resource, a failure type may be independently defined for each item in excess can occur (e.g. for each of items indicated by reference numbers 21 through 25 in FIG. 2). Or, the failure types may also include other failure cases such as runtime errors, which are not related to the amount of resources.

Figure 11:
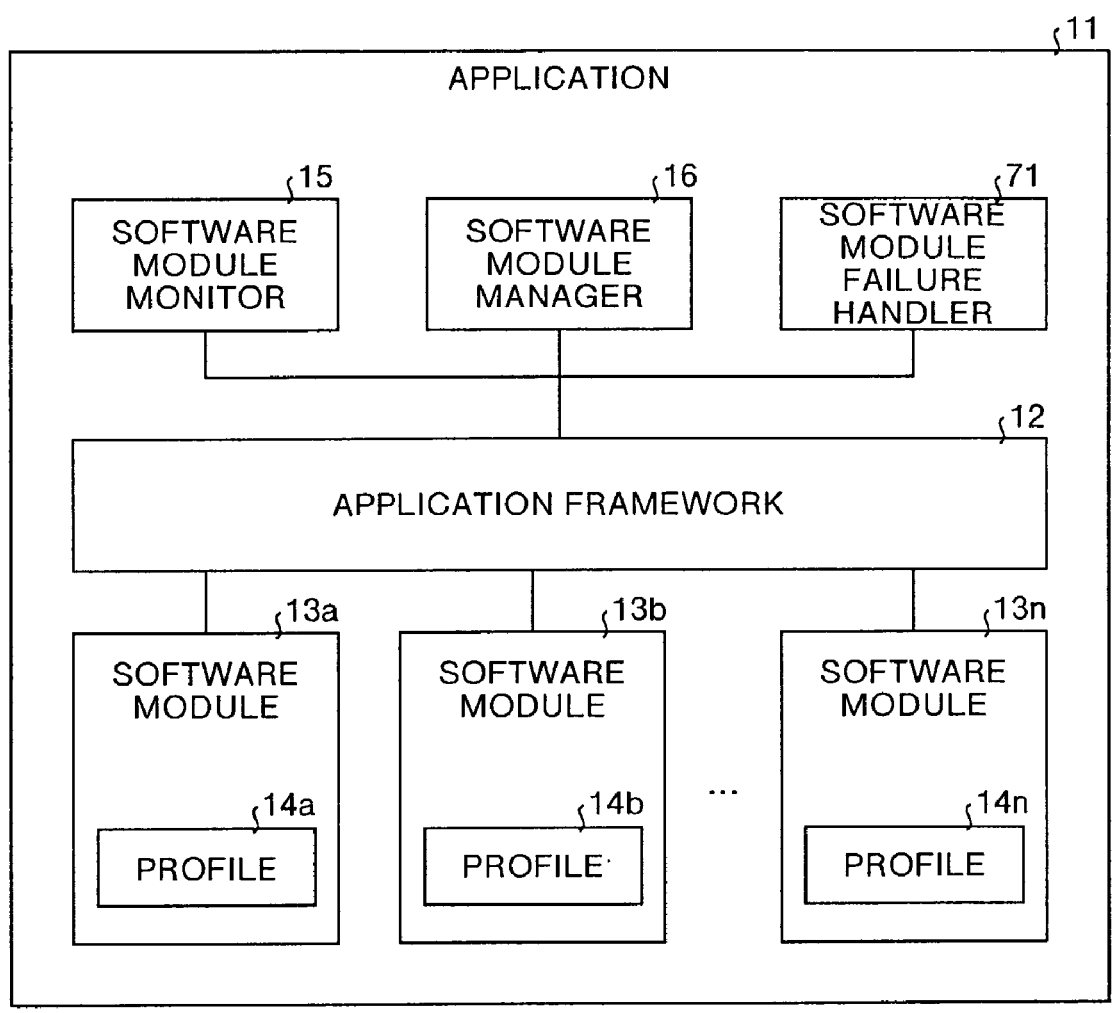
FIG. 11 is a diagram which shows a configuration of an application based on an application framework according to a fourth embodiment.

FIG. 11 is a diagram which shows a configuration of an application based on an application framework according to the fifth embodiment. More specifically, the figure is a configuration diagram which illustrates two sections, i.e. a section which holds information on a failure handling method for a failure occurrence in a software module, and a section which, upon occurrence of the failure in the software module, obtains the failure handling method stored in the profile of the software module, and performs the failure handling process for the software module in accordance with the method specified. The reference number 71 indicates a software module failure handler which, upon occurrence of a failure in a software module 13k, obtains a failure handling method corresponding to a type of the failure which has occurred in the software module 13k, from the corresponding profile 14k of the software module 13k, and performs the failure handling process for the software module 13k in accordance with the specified method.

Figure 12:
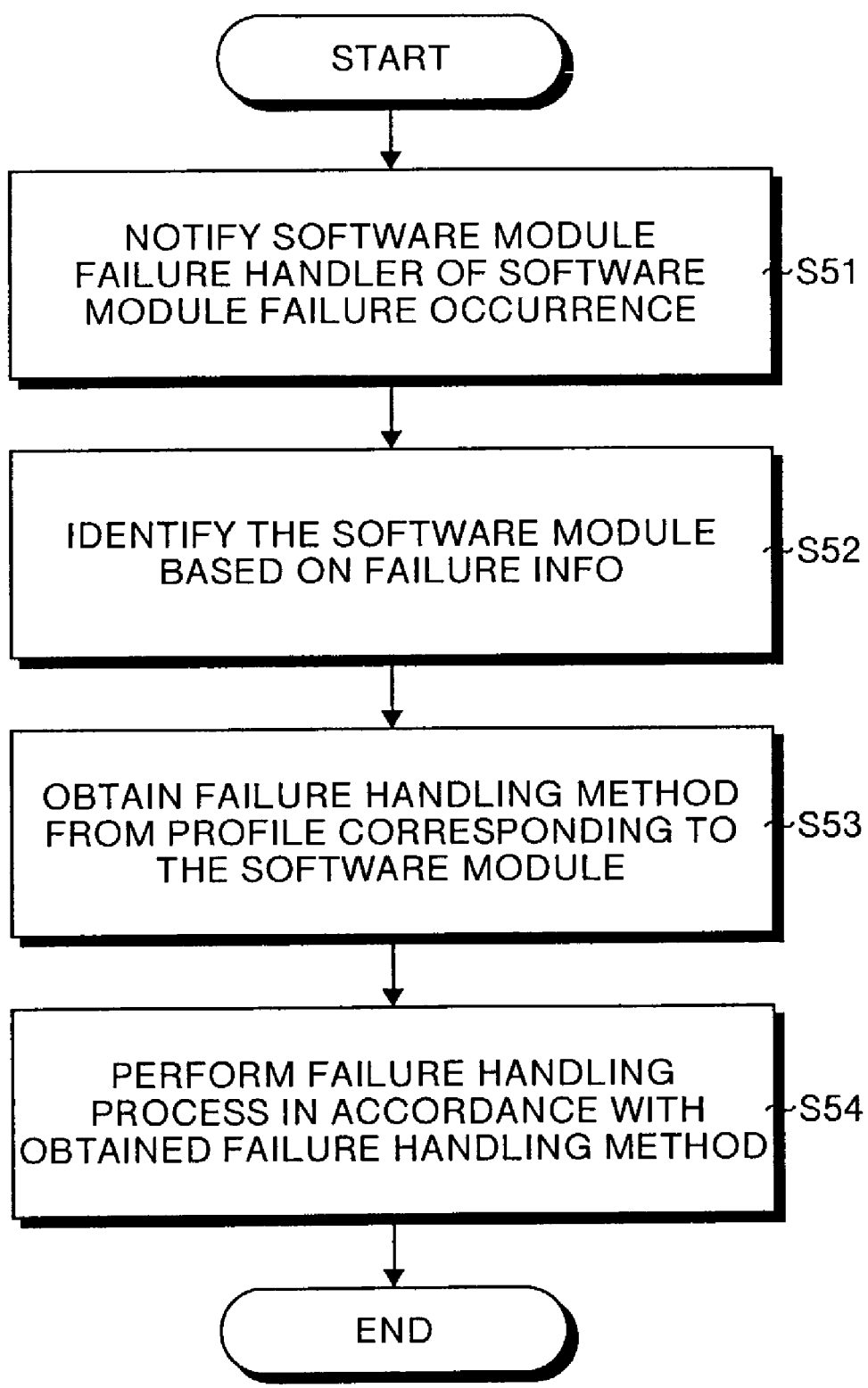
FIG. 12 is a diagram which shows an example of a processing procedure of the application framework according to the fourth embodiment.
Figure 13:
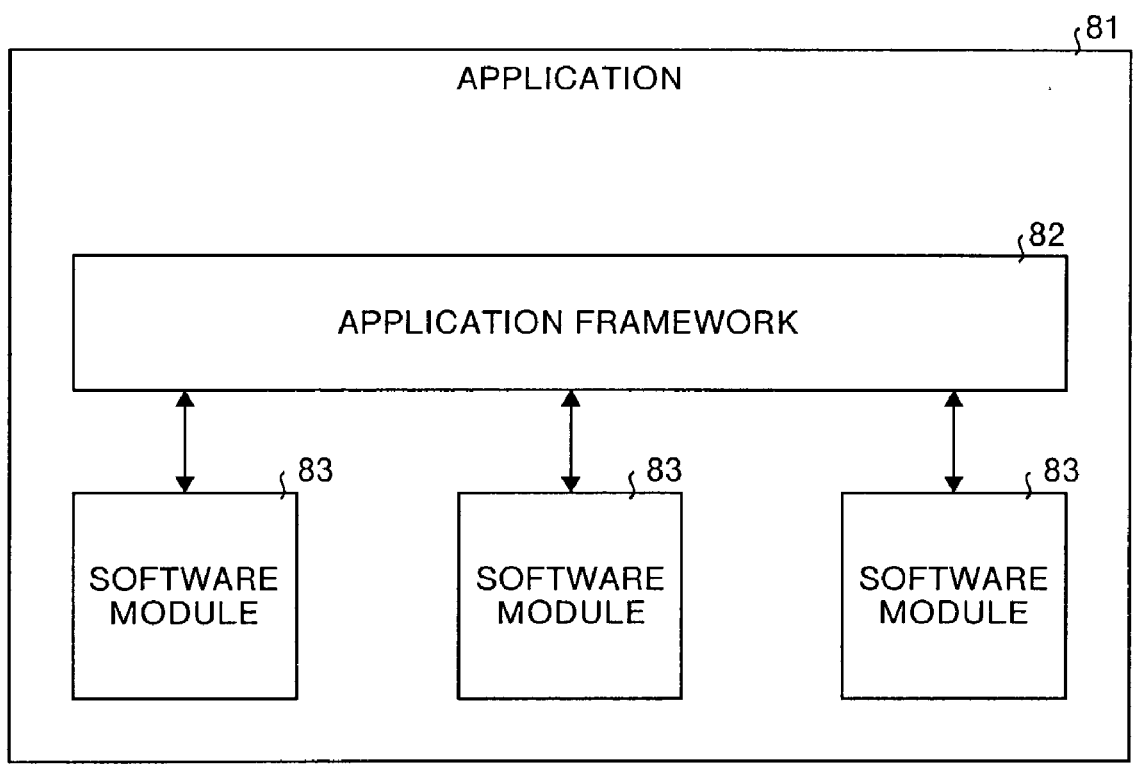
FIG. 13 is a diagram which shows a conventional configuration of an application based on an application framework.

An example of a processing procedure of the application framework according to the present embodiment will be described with reference to the flowchart in FIG. 12.

When a failure occurs in a software module 13k, the software module monitor 15 detects the occurrence of the failure. At step S51, the software module monitor 15 notifies the software module failure handler 71 of information on the failure which has occurred in the software module 13k. At steps S52, the software module failure handler 71 identifies, from the received failure information, the software module 13k as the cause of the failure. At step S53, the software module failure handler 71 obtains a failure handling method corresponding to the type of the failure which has occurred, from the profile 14k of the software module 13k. At step S54, the software module failure handler 71 performs the failure handling process in accordance with the failure handling method for the software module 13k.

Examples of the failure handling method include pausing, ceasing, deleting, replacing of the failed software module, followed by automatic restoration. Another example is to install and run diagnosing software, which is then followed by automatic restoration of the failed software module according to a given diagnosis. There are different options, and these options may be used individually or in combination depending on the kind of software module and the type of failure which has occurred. In order to reduce a burden on the computer system resources, as part of the failure handling method, the diagnosing software may be downloaded and linked with the application framework 12 for running only upon use.

It should be noted here that in order to simplify the process, or to simplify the profile, a common failure handling method may be used for all the failures regardless of the failure type.

As described above, an arrangement is made such that a failure handling method for a software module can be obtained, according to the type of the failure which has occurred in the software module via the profile before the entire system is disabled. Therefore, it has become possible to automatically perform an optimum failure handling process for each software module, in accordance with the kind of failure which has occurred. Further, even when a downloaded software module is added to the application, a profile is obtained at the same time so that a failure handling method for the relevant module can be obtained based on this, and thus, detailed handling of the added software module can be performed. Therefore, it becomes possible to improve computer system reliability and to perform an optimum automatic restoration of the system upon occurrence of a failure.

The computer system including an application framework according to one aspect of the present invention comprises a profile for each software module which records and stores, as execution related information, information concerning execution of the software module, including identification information of the software module, a software module monitor which detects a failure occurring at a time of execution of the software module added as the application, and notifies a software module manager of the failure as failure occurrence information, and the software module manager which identifies a failed software module from the notified failure occurrence information, obtains the execution related information from the profile of the identified software module, determines how to handle the software module on the basis of the obtained execution related information and the failure occurrence information, and directs the execution. Because of such configuration, a failure occurrence at a time of running the software module is detected at an early stage, and therefore, the failure detection can be performed before the entire computer system is disabled. This enables performing an automatic restoration process. Thus, it has become possible to improve reliability of the computer system, and to automatically restore the computer system upon occurrence of the failure. Further, since each software module has a profile, the profile can be obtained at the same time when the software module is downloaded. Thus, detailed management of the software module can be performed based on the execution related information described in the profile.

Further, the computer system further comprises a profile which records and stores as part of the execution related information a norm value on an amount of use of a computer system resource for the software module, and a resource manager which manages a use status of the computer system resource by the software module at the time of execution, obtaining norm value information on the amount of use of the computer system resource recorded and stored in the profile of the software module, detects a use of the computer system resource beyond the norm value on the amount of use as an occurrence of a failure in the software module, and notifies a software module manager of the occurrence of the failure. Moreover, the software module manager has an additional function of determining how to handle the software module based on the failure occurrence information detected by the resource manager, and directing the execution. Because of such configuration, a failure occurrence at a time of running the software module is detected at an early stage, and therefore, the failure detection can be performed before the entire computer system is disabled. This enables automation of a restoration process, leading to improved reliability of the computer system, and automatic restoration of the computer system upon occurrence of the failure. Further, since each software module has a profile, the profile can be obtained at the same time when the software module is downloaded. Thus, detailed management of the software module can be performed based on the execution related information described in the profile.

Furthermore, the software module manager has an additional function of obtaining the norm value information on the amount of use of the computer system resource recorded and stored in the profile of each software module already added as an application and of a software module to be added newly, calculating a norm value on the amount of use of the computer system resource for the application after the addition of the new software module, determining how to handle the software module to be added newly on the basis of a result of the calculation of the norm value on the amount of use of the resource and on the basis of a set value on a permitted amount of use of the computer system resource which is an amount of computer system resource allocated to the application in advance, and directing the execution. As a result, it has become possible to always maintain the amount of computer system resources needed at a time of running the application within a range of the permitted amount of use of the resources to the application. This eliminates a problem of system failure caused, for example, by excess use of the computer system resources while running an application after replacement or addition of a software module thereby improving high system reliability. Further, since each software module has a profile, the profile can be obtained at the same time when the software module is downloaded. Thus, detailed management of the software module can be performed based on the execution related information described in the profile.

Moreover, the software module manager has an additional function of recording and storing at the profile, as part of the execution related information, one or both of importance information and reliability information of the software module, obtaining one or both of the importance information and the reliability information together with the norm value information on the amount of use of the computer system resource from the profile of each software module already added as an application and of a software module to be added newly, calculating a norm value on the amount of use of the computer system resource for the application after the addition of the new software module, determining how to handle the software module to be added newly on the basis of a result of the calculation of the norm value on the amount of use of the resource, a set value on a permitted amount of use of the computer system resource which is an amount of computer system resource allocated to the application in advance, and on the basis of the norm value on the amount of use and one or both of the importance information and the reliability information of each software module already added and of the software module to be added newly, and directing the execution. As a result, it has become possible to always maintain the amount of computer system resources needed at a time of running the application within a range of the permitted amount of the use of the resource. At the same time, it has become possible to add and delete a new function, taking the importance and reliability of the software module into account. This enables construction of an optimum application while improving system reliability. Further, since each software module has a profile, the profile can be obtained at the same time when the software module is downloaded. Thus, detailed management of the software module can be performed based on the execution related information described in the profile.

Furthermore, the computer system comprises a defective-software-module registration table which registers identification information of a software module prohibited to run on the computer system. Moreover, the software module manager has an additional function of searching the defective-software-module registration table for the presence or absence of the registered identification information of a software module on the basis of the execution related information recorded at the profile of the software module, determining how to handle the software module to be added newly on the basis of a result of the search, and directing the execution. As a result, it has become possible to determine, before an adding process of a software module to the application, if the addition of the software module will lead to a high probability of failure occurrence. Therefore, it becomes possible to prevent failure occurrence on the computer system, and to improve system reliability. Further, since each software module has a profile, the profile can be obtained at the same time when the module is downloaded. Thus, even when such a software module is added to the application, detailed management of the added software module can be performed based on the execution related information described in the profile.

Moreover, the computer system further comprises a defective-software-module register which, when the execution related information at the profile includes failure occurrence history of the corresponding software module and an occurrence of a failure is detected as the failure occurrence information by one or both of the software module monitor and the resource manager, adds the failure occurrence to the failure occurrence history, determines on the basis of failure occurrence history whether or not the identification information of the failed software module recorded at the profile of the failed software module is additionally registered on the defective-software-module registration table, and executes the determination. As a result, it has become possible to judge whether or not the addition of this software module will lead to a high probability of failure recurrence. In addition, it has become possible to prevent recurrence of the failure on the computer system. Thus, it becomes possible to improve system reliability. Further, since each software module has a profile, the profile can be obtained at the same time when the module is downloaded. Thus, even when such a software module is added to the application, a known history of failure occurrences recorded in the profile can be taken into account for judging on and performing an additional registration of the software module on the defective-software-module registration table.

Furthermore, the computer system further comprises a profile which records and stores as part of the execution related information a failure handling method for a time of failure in a software module, and a software module failure handler which obtains how to handle the failure based on the profile of the failed software module on the basis of the failure occurrence information, and performs a failure handling process in accordance with the obtained failure handling method. As a result, it has become possible to automatically perform an optimum failure handling process for each software module, leading to improved reliability of the computer system and optimum system automatic restoration at a time of system failure. Even when a downloaded software module is added to the application, a profile is obtained at the same time so that a failure handling method for the relevant module can be obtained based on this, and thus, detailed handling of the added software module can be performed.

Moreover, the failure handling method according to another aspect of the present invention comprises detecting a failure having occurred at a time of execution of a software module added to the application framework, identifying the failed software module on the basis of the failure occurrence information detected, and obtaining execution related information of the identified software module from a profile which stores, in advance and for each software module, information concerning the execution of the software module as the execution related information, and determining how to handle the failed software module on the basis of the failure occurrence information and the execution related information obtained, and directing the execution. As a result, a failure occurrence at a time of running the software module is detected at an early stage, and therefore, the failure detection can be performed before the entire computer system is disabled. This enables to perform an automatic restoration process. Thus, it has become possible to improve reliability of the computer system, and to automatically restore the system upon occurrence of the failure. Further, since each software module has a profile, the profile can be obtained at the same time when the software module is downloaded. Thus, detailed management of the software module can be performed based on the execution related information described in the profile.

Furthermore, the computer program according to still another aspect of the present invention makes a computer execute detecting a failure having occurred at a time of execution of a software module added to the application framework, identifying the failed software module on the basis of the failure occurrence information detected, and obtaining execution related information of the identified software module from a profile which stores, in advance and for each software module, information concerning the execution of the software module as the execution related information, and determining how to handle the failed software module on the basis of the failure occurrence information and the execution related information obtained, and directing the execution. As a result, a failure occurrence at a time of running the software module is detected at an early stage, and therefore, the failure detection can be performed before the entire computer system is disabled. This enables performing an automatic restoration process. Thus, it has become possible to improve reliability of the computer system, and to automatically restore the computer system upon occurrence of the failure. Further, since each software module has a profile, the profile can be obtained at the same time when the software module is downloaded. Thus, detailed management of the software module can be performed based on the execution related information described in the profile.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer system including an application framework dynamically adding and deleting a software module as an application, the computer system comprising:
   a profile for each software module which records and stores, as execution related information, information concerning execution of the software module, including identification information for the software module, and a norm value on an amount of use of a computer system resource by the software module;
   a software module monitor which detects a failure occurring at a time of execution of a software module added as an application, and notifies a software module manager of the failure as failure occurrence information, wherein the software module manager notified of a failed software module by the failure occurrence information obtains the execution related information from the profile of the software module identified by the failure occurrence information, determines how to handle the failed software module identified based on the execution related information obtained and the failure occurrence information, and directs handling of the failed software module; and
   a resource manager which
      manages use status of the computer system resource by the software module upon execution, obtaining norm value information on the amount of use of the computer system resource recorded and stored in the profile of the software module,
      detects use of the computer system resource beyond the norm value on the amount of use as an occurrence of a failure in the software module, and
      notifies the software module manager of the failure, wherein the software module manager
         determines how to handle the software module based on the failure occurrence information detected by the resource manager,
         obtains the norm value information on the amount of use of the computer system resource recorded and stored in the profile of each software module already added as an application and of a software module to be added newly,
         calculates a norm value on the amount of use of the computer system resource for the application after the addition of the new software module,
         determines how to handle the software module to be added newly based on calculation of the norm value based on the amount of use of the resource and based on a set value on a permitted amount of use of the computer system resource, which is an amount of computer system resource allocated to the application in advance, and directs handling of the software module to be added.

2. The computer system according to claim 1, wherein the profile records and stores, as part of the execution related information, a failure handling method for a time of failure in a software module, and the computer system further comprises a software module failure handler which determines how to handle the failure based on the profile of the failed software module, based on the failure occurrence information, and performs a failure handling process in accordance with the failure handling method determined.

3. A computer system including an application framework dynamically adding and deleting a software module as an application, the computer system comprising:

a profile for each software module which records and stores, as execution related information, information concerning execution of the software module, including identification information for the software module, and a norm value on an amount of use of a computer system resource by the software module;

a software module monitor which detects a failure occurring at a time of execution of a software module added as an application, and notifies a software module manager of the failure as failure occurrence information, wherein the software module manager notified of a failed software module by the failure occurrence information obtains the execution related information from the profile of the software module identified by the failure occurrence information, determines how to handle the failed software module identified based on the execution related information obtained and the failure occurrence information, and directs handling of the failed software module; and a resource manager which
manages use status of the computer system resource by the software module upon execution, obtaining norm value information on the amount of use of the computer system resource recorded and stored in the profile of the software module, detects use of the computer system resource beyond the norm value on the amount of use as an occurrence of a failure in the software module, and notifies the software module manager of the failure, wherein the software module manager
determines how to handle the software module based on the failure occurrence information detected by the resource manager, records and stores in the profile, as part of the execution related information, at least one of importance information and reliability information of the software module, obtains at least one of the importance information and the reliability information together with the norm value information on the amount of use of the computer system resource from the profile of each software module already added as an application and of a software module to be added newly, calculates a norm value on the amount of use of the computer system resource for the application after the addition of the new software module, determines how to handle the software module to be added newly based on a result of the calculation of the norm value on the amount of use of the resource, a set value on a permitted amount of use of the computer system resource, which is an amount of computer system resource allocated to the application in advance, and based on the norm value on the amount of use and at least one of the importance information and the reliability information of each software module already added and of the software module to be added newly, and directs handling of the software module to be added.

4. A computer system including an application framework dynamically adding and deleting a software module as an application, the computer system comprising:

a profile for each software module which records and stores, as execution related information, information concerning execution of the software module, including identification information for the software module;

a software module monitor which detects a failure occurring at a time of execution of a software module added as an application, and notifies a software module manager of the failure as failure occurrence information, wherein the software module manager notified of a failed software module by the failure occurrence information obtains the execution related information from the profile of the software module identified by the failure occurrence information, determines how to handle the failed software module identified based on the execution related information obtained and the failure occurrence information, and directs handling of the failed software module;

a defective-software-module registration table which registers identification information of a software module prohibited from running on the computer system, wherein the software module manager searches the defective-software-module registration table for presence or absence of the registered identification information of a software module based on the execution related information recorded in the profile of the software module, determines how to handle the software module to be added newly based on a result of the search, and directs handling of the software module to be added, and a defective-software-module register which, when the execution related information in the profile includes failure occurrence history of the corresponding software module and an occurrence of a failure is detected as the failure occurrence information by at least one of the software module monitor and the resource manager, adds the failure occurrence to the failure occurrence history, determines, based on the failure occurrence history whether the identification information of the failed software module recorded in the profile of the failed software module is additionally registered on the defective-software-module registration table, and executes the determination.

* * * * *